Figure 1:
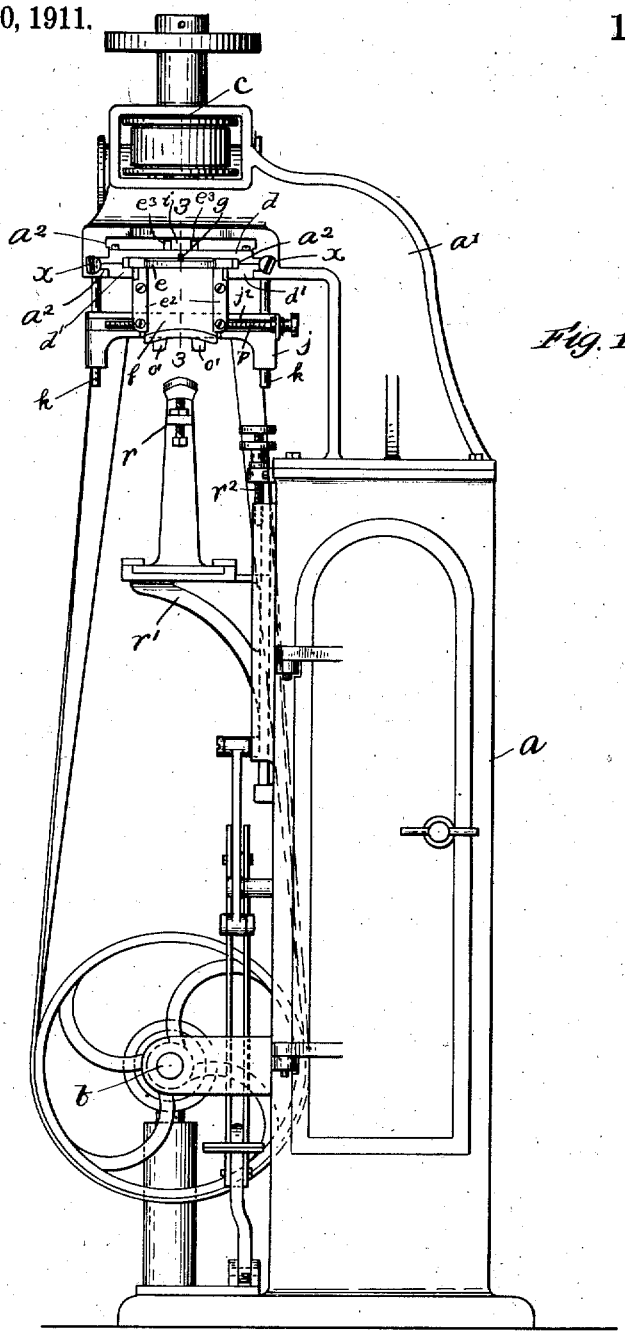

E. A. WEBSTER.

HEEL BREASTING MACHINE.

APPLICATION FILED APR. 21, 1911. 4 SHEETS—SHEET 1.

Reissued May 30, 1911. 13,253.

Witnesses:
H. B. Davis.
A. J. Brouson

Inventor:
Edwin A. Webster
by Hoyt & Hammond
Atty's

E. A. WEBSTER.

HEEL BREASTING MACHINE.

APPLICATION FILED APR. 21, 1911. 4 SHEETS—SHEET 2.

Reissued May 30, 1911. 13,253.

Witnesses:
H. B. Davis.
A. J. Brouson

Inventor:
Edwin A. Webster
by Noyes Hammond
attys

E. A. WEBSTER.

HEEL BREASTING MACHINE.

APPLICATION FILED APR. 21, 1911.

4 SHEETS—SHEET 3.

Reissued May 30, 1911.

13,253.

Witnesses:

H. B. Davis.

A. J. Brosson

Inventor:

Edwin A. Webster by Hoyt & Harriman

Atty's

E. A. WEBSTER.

HEEL BREASTING MACHINE.

APPLICATION FILED APR. 21, 1911.

Reissued May 30, 1911.

4 SHEETS—SHEET 4.

13,253.

Witnesses:
H. B. Davis.
A. J. Brouson

Inventor:
Edwin A. Webster
by Noyes & Kerriman
Atty's

UNITED STATES PATENT OFFICE.

EDWIN A. WEBSTER, OF GROVELAND, MASSACHUSETTS, ASSIGNOR TO HAVERHILL CHANNELING MACHINE CO., OF HAVERHILL, MASSACHUSETTS, A CORPORATION OF MAINE.

HEEL-BREASTING MACHINE.

13,253. Specification of Reissued Letters Patent. Reissued May 30, 1911.

Original No. 981,506, dated January 10, 1911, Serial No. 558,977. Application for reissue filed April 21, 1911. Serial No. 623,133.

*To all whom it may concern:*

Be it known that I, EDWIN A. WEBSTER, of Groveland, county of Essex, State of Massachusetts, have invented an Improvement in Heel-Breasting Machines, of which the following is a specification.

In heel breasting machines in which a stationary breasting knife is employed, or in which the knife is only moved transversely of its edge, or vertically downward, to perform the breasting operation, much difficulty is occasioned, particularly in breasting high heels, on account of the fact that the knife will almost invariably be deflected, or yield, to an extent, varying with the conditions, so that the breasted surface will not be straight, but will have a wavy appearance. This is objectionable, as additional labor in finishing is necessitated to straighten the surface. This difficulty may be entirely avoided by causing the knife to vibrate or reciprocate longitudinally of its edge, so that it makes a drawing cut as the heel is moved against it, but it is frequently necessary to breast different heels, with differently curved knives, and the difficulty of providing a machine with which blades of different curvatures may be conveniently employed has practically precluded the general use of a machine of this type. The longitudinal movement of the breasting knife in such a machine has, moreover, a strong tendency to cause a lateral tipping or corresponding vibration of the shoe, so that, with prior devices, the beneficial effect of the vibrating movement has been practically nullified.

The objects of my invention are to provide a heel-breasting machine having a longitudinally vibrating knife, with means whereby knives of all the different curvatures which may be required, may be used in the same machine and may be readily substituted one for another.

A further object of my invention is to provide means in connection therewith for securely holding the heel of the shoe against lateral, or tipping movement while on the jack and engaged by the vibrating breasting knife, said means to be readily adaptable to all sizes of heels.

I accomplish these objects by the means shown in the accompanying drawing.

Figure 3:
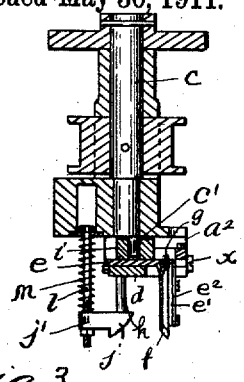
Figure 2:
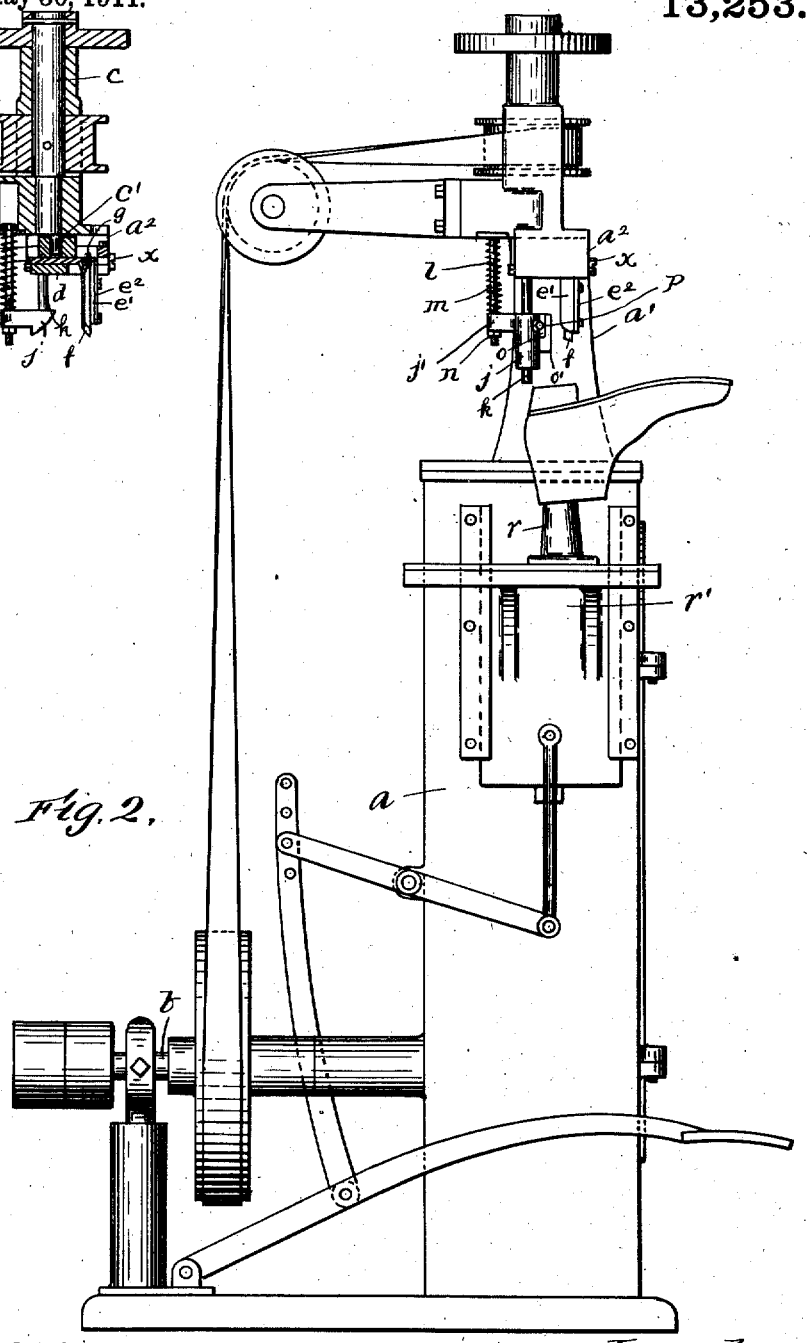
Figure 4:
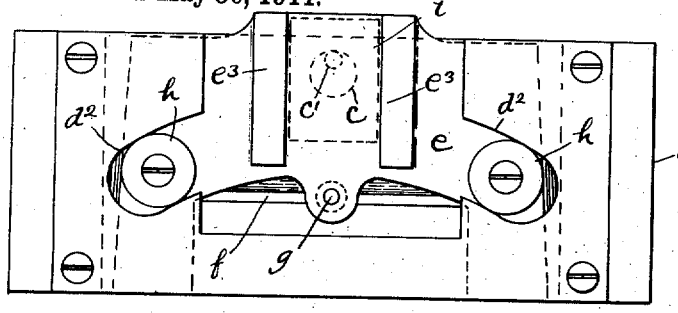
Figure 5:
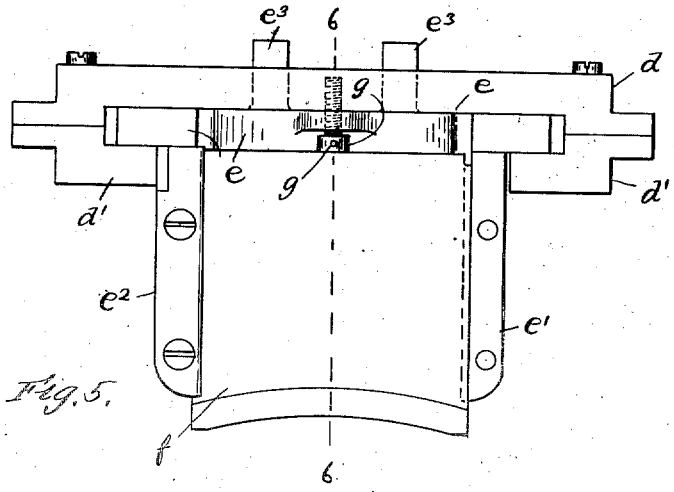
Figure 6:
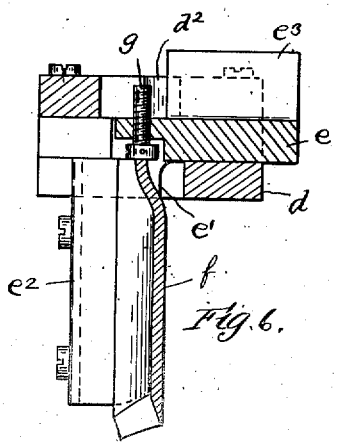
Figure 7:
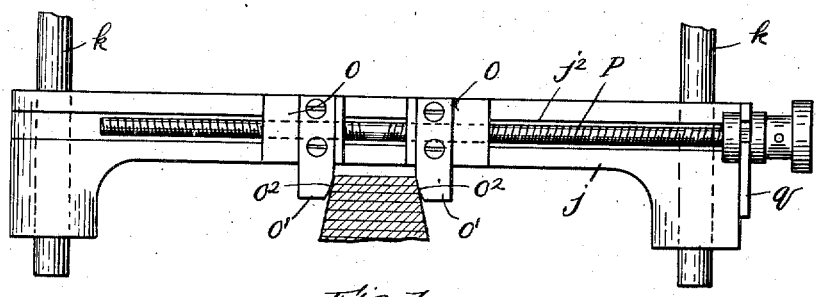
Figure 8:
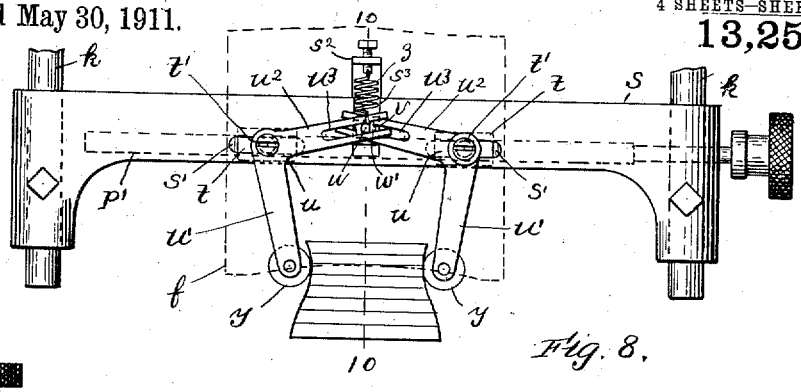
Figure 9:
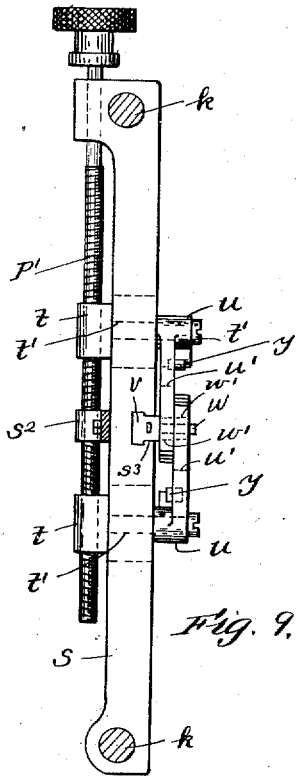
Figure 10:
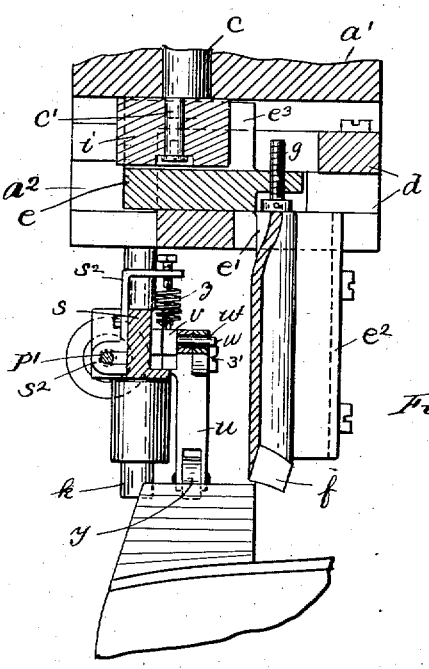

Figure 1 is a front elevation of a breasting machine provided with my invention, in which, Fig. 2 is a side elevation thereof, Fig. 3 is a detail sectional view at the line 3—3 of Fig. 1, Fig. 4 is a plan view of the breasting knife holder, Fig. 5 is a front view thereof, Fig. 6 is a sectional view on the line 6—6 of Fig. 5, Fig. 7 is a detail front view of the heel holding device and, Fig. 8 is a detail front elevation of a modified form of heel holder, Fig. 9 is a plan view thereof and, Fig. 10 is a sectional view, at the line 10—10 of Fig. 8, showing the connection with the adjacent portion of the machine.

As shown in the drawings, the base $a$, is provided with a main driving shaft $b$, which is adapted to drive a main operating shaft $c$, vertically mounted in the head $a'$, by means of suitable power transmitted by belts and pulleys.

The head $a'$ is provided with horizontal guideways $a^2$, opening to the front side of the machine, and a knife-block-holder $d$ is removably mounted in said guideways, suitable means for locking said holder therein being provided, as screws $x$, having portions of the heads thereof cut away at one side. Said holder $d$ is provided with a pair of guideway brackets $d'$ on its under side, and a knife-block $e$ is slidably supported on said brackets $d'$, so that it is universally movable in a horizontal plane. Said block $e$ is provided with a pair of depending, knife-supporting arms $e'$, having vertically disposed faces against which the breasting knife $f$ is adapted to be clamped by means of clamping plates $e^2$, and an adjustable stop screw $g$ is provided in the main part of the block $e$, which is adapted to bear against the upper end of the breasting knife $f$, so that it will hold the same against upward movement in the block. The holder $d$ is provided with a pair of curved guiding slots $d^2$, and a pair of friction rolls $h$ are rotatably mounted on the knife block $e$, said rolls being adapted to be moved freely in said slots $d^2$, so that when the block $e$ is moved longitudinally it will be moved in a curved path corresponding to the curvature of the slots $d^2$.

The knife $f$ is provided with a concave cutting edge and is longitudinally concaved to correspond with the curvature of the slots $d^2$. The knife block $e$ is provided with a pair of vertically disposed lugs $e^3$ on its upper side, between which a bearing block $i$ is reciprocally mounted, and the vertical shaft $c$ is provided with an eccentric pin $c'$ at its lower end, which is rotatably mounted in, and connected to the bearing block $i$, so that when the shaft $c$ is rotated the knife block $e$ will be reciprocated.

A carrier $j$ is mounted to slide on a pair of vertically depending rods $k$, which are secured on the under side of the head a short distance in the rear of, and at opposite sides of the breasting knife, and a rod $l$, is also mounted in the head in a position parallel to said rods $k$, and is adapted to extend through a rearwardly extending bracket $j'$, on the rear side of the carrier $j$. A spring, $m$, is mounted on the rod $l$, between the head and the upper end of the bracket $j'$, and a stop nut $n$, is mounted on the lower end of said rod $l$, said nut acting to support the carrier and limit the downward movement thereof. The carrier $j$, is provided with a longitudinal slot $j^2$, which extends therethrough and in which a pair of dogs $o$ are slidably mounted, and an adjusting screw, $p$, having a swivel connection with a bracket $q$ on the carrier, extends through said dogs $o$ and is provided with right and left screw threads, which respectively engage the same, so that when said screw is turned in one direction said dogs will be simultaneously moved toward each other, and when turned in the opposite direction, will be simultaneously moved away from each other.

Each block $o$ is provided with a depending finger $o'$, having heel-engaging faces $o^2$ at their adjacent sides, which are arranged to diverge to a slight extent as they extend downwardly. A jack $r$ is mounted on a vertically movable table $r'$, which is adapted to be lifted by a suitable treadle mechanism connected thereto, as shown in Fig. 2, so that when said treadle is depressed, said jack will be lifted toward the breasting knife, an adjustable stop $r^2$, being provided to limit the upward movement of the jack, such movement of the jack toward and from the breasting-knife being herein referred to as transversely of the knife edge.

In operation, the breasting knife $f$, is caused to reciprocate rapidly longitudinally of its edge. The shoe is placed on the jack $r$, and, as it is lifted, the fingers $o'$ will engage the sides of the heel, at its top, so that it will become firmly wedged between the diverging faces thereof. As the jack is lifted further, the breast portion of the heel will be brought into engagement with the knife, so that the heel will be breasted in a manner which will be obvious, and, as the jack is lifted to perform this operation, the carrier will be lifted thereby, so that the relative positions of the shoe and the holder will be maintained and the heel will be firmly held against lateral movement during the entire breasting operation, a firm engagement between the holder and the heel being maintained by the spring $m$. When the operation is finished and the jack lowered, the carrier $j$ will also be lowered against the stop $n$.

In case it is desired to employ a knife having a different curvature, the holder $d$ will be unlocked and withdrawn from the guideways in which it is held, and another block of similar construction, but having a cam path curved on a different radius, and a different knife block provided with a breasting knife curved on said radius, will be inserted, the block $i$, being readily disengaged from the block $e$, as holder $d$ is withdrawn, and the corresponding parts being reëngaged when inserted.

In Figs. 8, 9 and 10 I show a modified form of heel holding means which is especially desirable when heels having concave sides, so that the top lift is of greater width than some of the intermediate lifts, are to be breasted. In this form of my invention, a frame $s$ is rigidly secured, at a suitable elevation, to the under side of the head by suitable means, as by adjustably mounting it on the guide rods $k$, before described. Said frame $s$ is provided with a pair of horizontal slots $s'$ in which a pair of blocks $t$ are slidably mounted. A screw $p'$, similar to the screw $p$, already described, is connected to said blocks $t$, by means of right and left threads, and is held from longitudinal movement with relation to the frame $s$ by means of a swivel connection therewith, provided by a bracket $s^2$ mounted thereon. A pair of right-angular shaped, or bell-crank levers $u$ are respectively mounted on pivots $t'$ secured in blocks $t$, with the arms $u'$ thereof depending from said pivots $t'$, and the arms $u^2$ thereof extending toward each other, and overlapping, as shown. the arms $u^2$ are each provided with longitudinal slots $u^3$ which extend from the ends of said arms toward the pivot thereof for a suitable distance, and a block $v$ is mounted to slide vertically in a slot $s^3$ in the frame, said block having a bolt $w$, mounted therein, on which a pair of rectangular shaped blocks $w'$ are pivotally mounted, said blocks being respectively arranged in the slots $u^3$, so that they may slide therein. A spring $z$, is connected to the upper end of the block $v$, and to the bracket $s^2$ and acts to draw said block upwardly, and thereby to swing the arms $u'$ toward each other. Said arms $u'$ are provided with friction rolls $y$, in their ends, mounted to rotate on pivots which extend parallel to the pivots $t'$, as shown, the centers of said rolls being held approximately at, or slightly above, the level of the edge of the breasting knife $f$. With this construction, when the block $v$ is moved upwardly, the rolls $y$ will be simultaneously swung toward each other and when it is moved down they will likewise be swung apart, but in all positions thereof they will be held equidistant from the vertical plane in which the axis of the blocks $w'$ constantly lies. The jack is also arranged so that the central vertical plane thereof is coincident with said vertical plane of said axis.

By turning the adjusting screw $p'$ the blocks $t$ may be simultaneously adjusted either toward or from the central vertical plane of the axis of blocks $w'$, or the middle of the jack, so that the levers $u$ will be correspondingly adjusted. This adjustment should be such that, when the jack is raised, the edge of the top lift of the heel to be breasted will engage the rolls $y$ between the vertical planes of the axes thereof, so that the levers $u$ will be forced away from each other and the rolls will be permitted to roll down on the sides of the heel, the spring $z$ acting to hold the rolls firmly against the sides of the heel in all the vertical positions thereof. As the breasting knife is reciprocated the tendency of the knife to pull the heel laterally will be effectively resisted by the spring $z$, acting through the parts which directly engage the heel. With this arrangement, it will not be possible for either roll to move to a greater distance from the central line than the other, so that the heel will at all times be centrally held with relation to the breasting knife.

I claim:

1. In a heel-breasting machine having a breasting knife and means for reciprocating the same longitudinally of its edge, a jack, means for causing relative movement of said jack and said knife transversely of the knife edge, and means for engaging the heel of a shoe held on the jack to hold the same against the reciprocating action of the knife, substantially as described.

2. In a heel-breasting machine having a breasting knife and means for reciprocating the same longitudinally of its edge, a jack, means for causing relative movement of said jack and said knife transversely of the knife edge, and engaging devices for the opposite sides of the heel of a shoe held on the jack arranged to hold the heel against the reciprocating action of the knife as the breasting operation is performed, and means permitting movement of said devices in opposite directions with relation to the jack according to the variations of the heels in width, substantially as described.

3. In a heel-breasting machine having a breasting knife and means for reciprocating the same longitudinally of its edge, a jack, means for causing relative movement of said jack and said knife transversely of the knife edge, and holding devices disposed at opposite sides of the jack in position to engage the sides of the heel of a shoe supported thereon, means for holding said devices at points equidistant from the middle of said jack and means permitting adjustment of said devices toward and from each other, substantially as described.

4. In a heel-breasting machine having a breasting knife and means for reciprocating the same longitudinally of its edge, a jack, means for causing relative movement of said jack and said knife transversely of the knife edge, and holding devices disposed at opposite sides of the jack in position to engage the sides of the heel of a shoe supported thereon, means for holding said devices at points equidistant from the middle of said jack and means for simultaneously adjusting said devices toward and from each other, substantially as described.

5. In a heel-breasting machine having a breasting knife and means for reciprocating the same longitudinally of its edge, a jack movable toward and from said knife transversely of the edge thereof, to breast the heel of a shoe supported thereon, and heel-holding devices disposed to engage opposite sides of the heel and movable with the jack to hold the heel against the reciprocating action of the knife as the breasting operation is performed, substantially as described.

6. In a heel-breasting machine having a breasting knife and means for reciprocating the same longitudinally of its edge, a jack movable toward and from said knife transversely of the edge thereof, to breast the heel of a shoe supported thereon, and heel-holding devices having diverging faces extending toward the jack and disposed to engage opposite sides of the heel as the jack is moved toward the knife to hold the heel against the reciprocating action of the knife as the breasting operation is performed, substantially as described.

7. In a heel-breasting machine having a depending breasting knife and means for reciprocating the same horizontally, a jack movable vertically to carry the heel of a shoe supported thereon into engagement with said knife, to breast the same, a vertically movable support disposed over said jack and having heel-holding devices mounted thereon in position to engage opposite sides of the heel as it is engaged by the knife, said support being adapted to be lifted by the jack as the jack is raised to perform the breasting operation, substantially as described.

8. A heel-breasting machine comprising a frame, a rotatable shaft mounted therein having an eccentric portion, a holder mounted adjacent said shaft and having guideways, a knife-block mounted to reciprocate in said guideways, means for removably connecting said knife-block and said eccentric portion to cause reciprocation of said block thereby, and means for removably connecting said holder to the frame arranged to permit disconnection of the knife-block and the shaft as the holder is removed from the frame, substantially as described.

9. A heel-breasting machine comprising a frame, a shaft rotatably mounted therein, a holder having guideways, a knife-block reciprocally mounted in said guideways, means for removably connecting said holder to the frame and said block to said shaft, to cause reciprocation of said block when the shaft is rotated and permit simultaneous removal of the holder and knife-block from the frame, substantially as described.

10. A heel-breasting machine comprising a frame having guideways therein, a shaft rotatably mounted in said frame adjacent said guideways and having an eccentric portion, a holder slidably mounted in said guideways and having knife-block guideways formed therein, means for locking said holder in the frame when in position on the guideways thereof, a knife-block reciprocally mounted in the guideways of said holder, means permitting engagement of the eccentric portion of said shaft and said block to cause reciprocation of the latter when the shaft is rotated, and constructed to permit disengagement therewith when the holder is removed from the frame, substantially as described.

11. In a heel-breasting machine, a breasting knife having its ends extending at approximately right angles to its cutting edge and a holder therefor having supporting arms extending approximately the width of the knife and provided with supporting faces for the end portions thereof, and means for clamping said end portions against said faces, substantially as described.

12. In a heel-breasting machine, a breasting knife having its ends extending at approximately right angles to its cutting edge and a holder therefor having supporting arms extending for approximately the width of the knife and provided with supporting faces for the end portions thereof and means for clamping said end portions against said faces and an adjustable stop on the holder disposed to engage the side edge of the knife opposite its cutting edge, substantially as described.

In testimony whereof, I have signed my name to this specification, in the presence of two subscribing witnesses.

EDWIN A. WEBSTER.

Witnesses:

L. H. Harriman,

H. B. Davis.